C. MARKEL.
TIRE RETAINER.
APPLICATION FILED JULY 27, 1910.

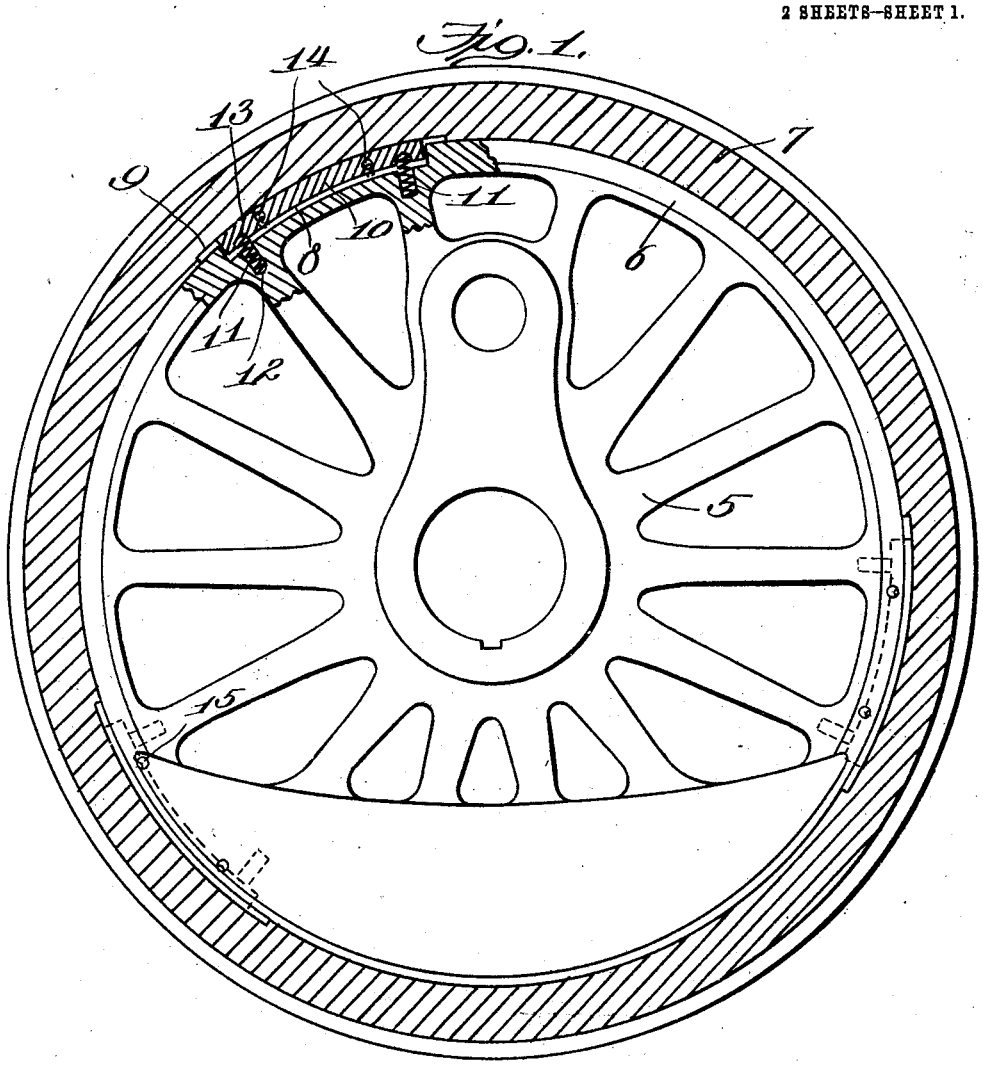
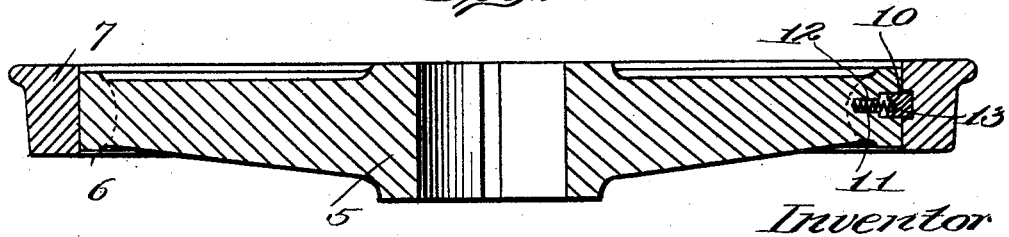

978,766.

Patented Dec. 13, 1910.
2 SHEETS—SHEET 2.

Witnesses:

Inventor
Charles Markel
By
James L. Norris
Atty

UNITED STATES PATENT OFFICE.

CHARLES MARKEL, OF CLINTON, IOWA.

TIRE-RETAINER.

978,766.  Specification of Letters Patent.  Patented Dec. 13, 1910.

Application filed July 27, 1910. Serial No. 574,197.

*To all whom it may concern:*

Be it known that I, CHARLES MARKEL, a citizen of the United States, residing at Clinton, in the county of Clinton and State of Iowa, have invented new and useful Improvements in Tire-Retainers, of which the following is a specification.

This invention relates to wheels used as locomotive drivers, and in engine or tender truck organizations, but may be embodied as a part of the wheel structure of any other vehicle having the tire shrunk on the wheel center and depending on shrinkage to hold the tire in place.

The invention has particular reference to a tire retainer or retaining means, and the primary object of the same is to prevent a tire from moving in or out or from creeping on the wheel center.

A further object of the invention is to provide simple and effective means for causing a tire to be driven in either direction that a wheel is revolving if the tire should become loose.

A still further object of the invention is to provide tire retaining means which will permit a tire to be removed and replaced if necessary without detaching a wheel from its axle or truck and thereby materially reduce the expense of repair of locomotive drivers, engine or tender trucks and the like.

With these and other objects and advantages in view, the invention consists in the construction and arrangement of parts which will be more fully hereinafter set forth.

Figure 3:
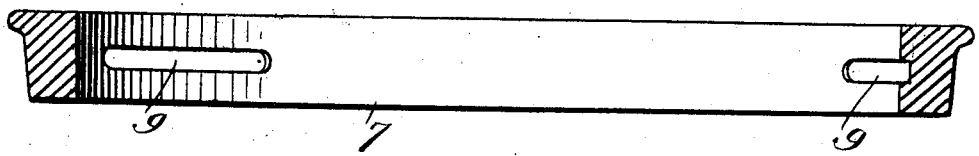
Figure 4:
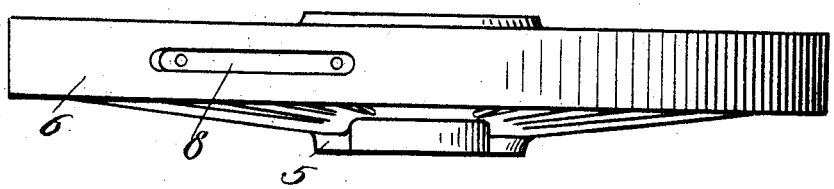
Figure 5:
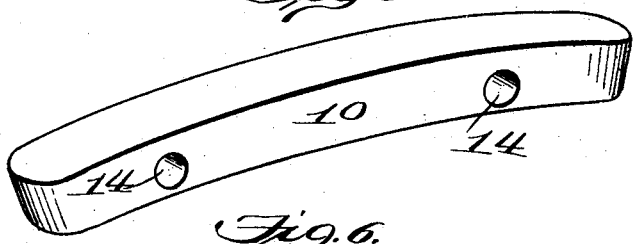
Figure 6:
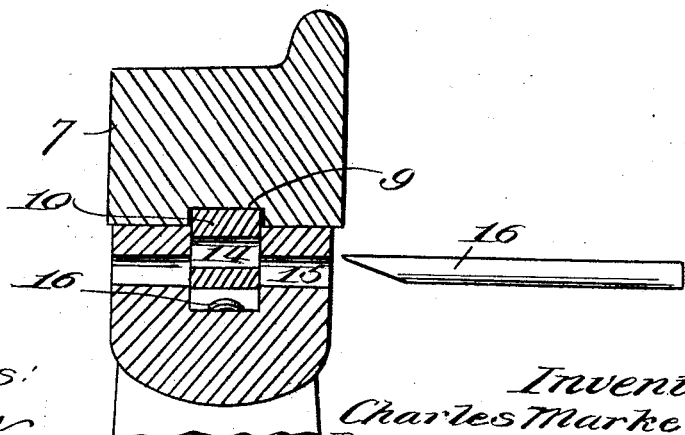

In the drawing: Figure 1 is a side elevation of a locomotive driver, partially in section, and embodying the features of the invention. Fig. 2 is a horizontal section taken through the center of the driver. Fig. 3 is a horizontal section of the rim for the driver. Fig. 4 is a top plan view of the driver with the rim removed. Fig. 5 is a perspective view of one of the retaining blocks. Fig. 6 is an enlarged detail cross-section of a portion of the driver center and rim.

The numeral 5 designates the center of a driver of usual form and embodying a rim 6 on which is fitted a flanged tire 7. As hereinbefore indicated, however, the invention may be applied to any vehicle wheel having a center or core and tire shrunk thereon, and the tire may be of any form.

The rim 6 is formed with cavities or recesses 8 at equal distances apart, three cavities being shown in the drawings, but the number may be varied. The inner portion or side of the tire 7 adjacent to the rim 6 is also formed with cavities or recesses 9 of the same number as and adapted to coincide with said cavities 8. The cavities or recesses 9 are of less depth and longer than the cavities or recesses 8 and are virtually seat grooves. Within the cavities or recesses 8 are retaining blocks 10 which are movable or projectible outwardly into the cavities or recesses 9. These retaining blocks are of such dimensions that they may be fully drawn into the cavities or recesses 8 to clear the cavities or recesses 9 and permit the tire 7 to be removed and reset or reapplied, or replaced by another tire of similar structure.

The blocks 10 are normally held outwardly in engagement with the cavities or recesses 9, and various means may be used for this purpose, a preferred simplified means being shown in the drawings in the form of springs 11 interposed between the inner portions of the opposite extremities of each block and the outer corresponding portions of the base wall of the cavity or recess 8. The springs 11 are fitted in sockets 12 and 13 respectively formed in the rim 6 and the block 10, the sockets 12 being materially deeper than the sockets 13 to permit the springs to be compressed thereinto when the block is drawn inwardly into the cavity or recess 8. Each block 10 is formed with a pair of openings 14 to coöperate or coincide with openings 15 extending transversely through the side walls of the cavity or recess 8 for the purpose of receiving keys or tapered drifts 16 which are driven through the said openings to draw each block inwardly into the cavity or recess 8 when it is desired to remove the tire 7 or to place or set a tire on the rim 6. After the tire has been removed or set the keys or drifts 16 are withdrawn from the openings 14 and 15 and each block when thus released is forced outwardly to engage the adjacent cavity or recess 9 of the tire.

By means of the retaining blocks 10 and the cavities or recesses 8 and 9 the tire is forced to revolve with the driver or wheel center 5, and, furthermore, the tire is prevented from coming off the center or from moving in or out, or from creeping on the said center. Furthermore, in the event that the tire becomes loose it will be driven either forwardly or rearwardly with the wheel center by reason of the fact that the opposite ends of each cavity or recess 9, which is longer than the cavity or recess 8, will strike the opposite ends of the block and the loose play of the tire will thus be limited and as a consequence the tire will be forced to revolve with the wheel center despite the fact that the tire may be loose.

The improved tire retainer or retaining means will be found exceptionally advantageous in its use, and being of a simple construction may be applied at comparatively small cost.

Changes in the proportions and dimensions as well as the minor details of construction may be adopted without departing from the spirit of the invention.

What is claimed as new is:

In a device of the class set forth, the combination of a wheel center having a rim with cavities therein at intervals, retaining blocks movably mounted in said cavities and projectible outwardly beyond the rim, and a tire having cavities in the inner portion thereof coinciding with those of the rim and slightly longer than the said rim cavities.

In testimony whereof I have hereunto set my hand in presence of two subscribing witnesses.

CHARLES MARKEL.

Witnesses:
L. W. BARKER,
H. C. JENSEN.